(12) United States Patent
Rempe et al.

(10) Patent No.: US 8,065,810 B2
(45) Date of Patent: Nov. 29, 2011

(54) APPARATUS AND SYSTEMS FOR MEASURING ELONGATION OF OBJECTS, METHODS OF MEASURING, AND REACTOR

(75) Inventors: Joy L. Rempe, Idaho Falls, ID (US); Darrell L. Knudson, Firth, ID (US); Joshua E. Daw, Idaho Falls, ID (US); Keith G. Condie, Idaho Falls, ID (US); Carl M. Stoots, Idaho Falls, ID (US)

(73) Assignee: Battelle Energy Alliance, LLC, Idaho Falls, ID (US)

( * ) Notice: Subject to any disclaimer, the term of this patent is extended or adjusted under 35 U.S.C. 154(b) by 393 days.

(21) Appl. No.: 12/419,916

(22) Filed: Apr. 7, 2009

(65) Prior Publication Data

US 2010/0254503 A1  Oct. 7, 2010

(51) Int. Cl.
*G01B 7/02* (2006.01)
*G21C 17/00* (2006.01)

(52) U.S. Cl. ............. 33/502; 33/701; 33/712; 33/789; 376/245; 374/56

(58) Field of Classification Search ............ 33/502, 33/701, 712, 789; 376/245; 374/56
See application file for complete search history.

(56) References Cited

U.S. PATENT DOCUMENTS

| | | | |
|---|---|---|---|
| 3,680,357 A | | 8/1972 | Clusener |
| 4,607,435 A | * | 8/1986 | Boisen ............... 33/700 |
| 4,697,322 A | * | 10/1987 | Knecht et al. ......... 29/402.03 |
| 4,702,105 A | * | 10/1987 | Raymont, Jr. ......... 73/168 |
| 4,762,003 A | | 8/1988 | Cioletti |
| 4,788,026 A | * | 11/1988 | Widener ............ 376/245 |
| 4,831,737 A | * | 5/1989 | Grund ............... 33/702 |
| 4,884,456 A | * | 12/1989 | Meline et al. ......... 73/826 |
| 5,465,278 A | * | 11/1995 | Cowan et al. ......... 376/245 |
| 6,415,526 B1 | * | 7/2002 | Buckner et al. ........ 33/833 |
| 6,803,758 B1 | | 10/2004 | Nicholson |
| 2005/0283989 A1 | * | 12/2005 | Pettersson ........... 33/502 |

OTHER PUBLICATIONS

Macro Sensors LVDT Accessories, "Core Connecting Rod," <<http://www.macrosensors.com/lvdt_macro_sensors/lvdt_products/lvdt_accessories/lvdt_co...>> (2004-2008), 3 pages.

* cited by examiner

*Primary Examiner* — Christopher Fulton
(74) *Attorney, Agent, or Firm* — Traskbritt

(57) ABSTRACT

Elongation measurement apparatuses and systems comprise at least two Linear Variable Differential Transformers (LVDTs) with a push rod coupled to each of the at least two LVDTs at one longitudinal end thereof. At least one push rod extends to a base and is coupled thereto at an opposing longitudinal end, and at least one other push rod extends to a location spaced apart from the base and is configured to receive a sample between an opposing longitudinal end of the at least one other push rod and the base. Nuclear reactors comprising such apparatuses and systems and methods of measuring elongation of a material are also disclosed.

22 Claims, 3 Drawing Sheets

APPARATUS AND SYSTEMS FOR MEASURING ELONGATION OF OBJECTS, METHODS OF MEASURING, AND REACTOR

GOVERNMENT RIGHTS STATEMENT

This invention was made with government support under Contract Number DE-AC07-05ID14517 awarded by the United States Department of Energy. The government has certain rights in the invention.

TECHNICAL FIELD

Embodiments of the present invention relate to apparatus, systems and methods of measuring elongation of an object. More particularly, embodiments of the present invention relate to apparatus, systems and methods for measuring elongation of objects in high temperature environments, and reactors incorporating measurement apparatus and systems.

BACKGROUND

For several applications, real-time measurements of specific materials are necessary for safe and proper operations and experimentation. For example, neutron radiation experiments have conventionally used in-pile instrumentation to monitor and measure in-situ major physical parameters. Some of the most typical in-pile measurements include fuel or material sample temperatures, fuel rod or material sample dimensions, fission gas release in fuel rods, neutron flux, and gamma heating. In the case of measuring fuel rod or material sample dimensions, conventional elongation sensors and diameter gauges have been employed, including Linear Variable Differential Transformers (LVDTs) for measuring elongation and contraction of fuel rods or material samples.

Limitations in conventional instrumentation have arisen as the need for very precise real-time in-pile measurements has increased. For example, conventional LVDTs are typically limited in their ability to function in high temperature environments. Some LVDTs are available that are capable of functioning in environments of less than about 550° C. However, changes in length of materials and fuels being irradiated at temperatures greater than about 550° C. are not typically measurable in real time. To overcome the temperature limitations of conventional LVDTs, samples irradiated at higher temperatures are typically measured prior to and after irradiations. Such methods are very expensive and provide no real-time information of what is occurring during the irradiation. Additionally, errors are often introduced when samples are removed from the reactor.

BRIEF SUMMARY

Various embodiments of the present invention comprise elongation measurement apparatuses which are capable of measuring, in real time, elongation of materials in environments well above 550° C. In one or more embodiments, an elongation measurement apparatus may comprise at least one sample carrier and at least one control component within an enclosure. The at least one sample carrier may comprise an LVDT at one longitudinal end of the at least one sample carrier. A push rod may be coupled to the LVDT and may extend to a location proximate to and spaced from an opposing longitudinal end of the at least one sample carrier so that the at least one sample carrier is configured to receive a sample between and adjacent to the push rod and the opposing longitudinal end of the at least one sample carrier. The at least one control component may comprise a control LVDT at one longitudinal end of the at least one control component, and a control push rod coupled to the control LVDT and extending to and adjoining an opposing longitudinal end of the at least one control component.

Other embodiments comprise an elongation measurement system. In one or more embodiments, an elongation measurement system may comprise at least two LVDTs and a push rod coupled to each of the at least two LVDTs at one longitudinal end thereof. At least one push rod may extend to an opposing longitudinal end and may be coupled to the opposing longitudinal end. At least one other push rod may extend to a location spaced apart from the opposing longitudinal end and may be configured to receive a sample between the at least one other push rod and the opposing longitudinal end. A computational system may be electrically coupled to the at least two LVDTs.

Still other embodiments comprise nuclear reactors. In one or more embodiments, a nuclear reactor may comprise a reactor core. At least one elongation measurement apparatus may be positioned relative to the reactive core, with one longitudinal end away from the reactor core and with an opposing longitudinal end directed toward the reactor core. The at least one elongation measurement apparatus may comprise at least two LVDTs at the one longitudinal end thereof and a push rod coupled to each of the at least two LVDTs. At least one push rod may extend to the opposing longitudinal end and may be coupled thereto. At least one other push rod may extend to a location spaced apart from the opposing longitudinal end and may be configured to receive a sample between the at least one other push rod and the opposing longitudinal end.

Other embodiments comprise methods of measuring elongation of a material. In at least one embodiment, the methods may comprise positioning a sample carrier in a test environment. The sample carrier may be positioned with a longitudinal end comprising a LVDT positioned away from a source of the test environment and an opposing longitudinal end comprising a sample positioned toward the source of the test environment. The sample carrier may comprise a push rod extending between the sample and the LVDT. A control component may be positioned in the test environment with a longitudinal end comprising a control LVDT positioned away from the source of the test environment and an opposing longitudinal end positioned toward the source of the test environment. The control component may comprise a push rod extending between the opposing longitudinal end thereof and the control LVDT. Respective elongation measurements may be generated with the LVDT of the sample carrier and with the LVDT of the control component, and a sample elongation value may be generated comprising the difference between the respective elongation measurements.

DETAILED DESCRIPTION

The illustrations presented herein are, in some instances, not actual views of any particular elongation apparatus or nuclear reactor, but are merely idealized representations which are employed to describe the present invention. Additionally, elements common between figures may retain the same numerical designation.

Figure 1:
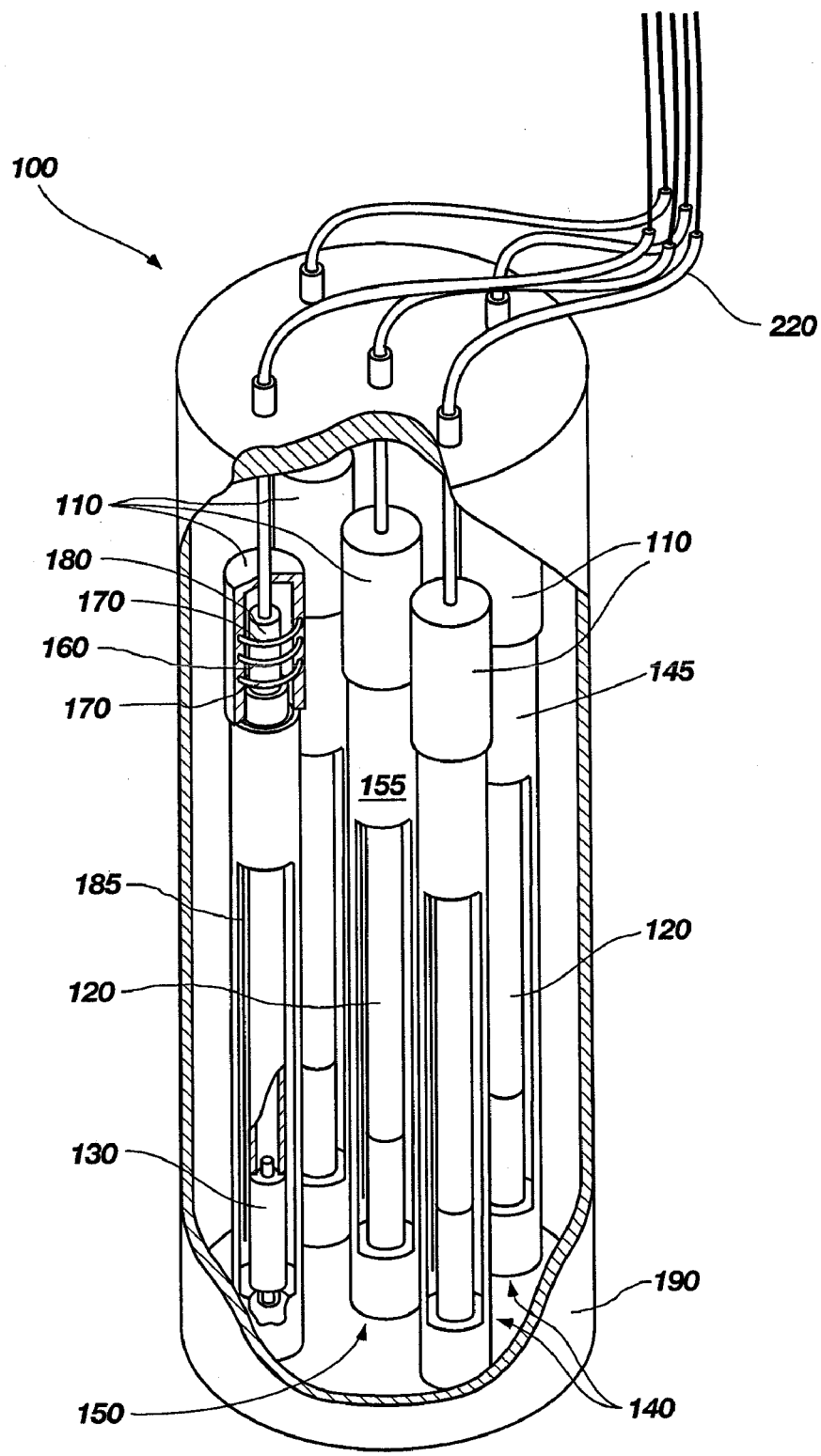
FIG. 1 illustrates a partially sectioned view of an elongation measurement apparatus according to at least one embodiment.

Various embodiments of the present invention are directed toward embodiments of an elongation measurement apparatus capable of providing elongation measurements of materials in environments greater than 550° C. FIG. 1 illustrates a partially sectioned view of an elongation measurement apparatus 100 according to at least one embodiment of the invention. The elongation measurement apparatus 100 may comprise at least two Linear Variable Differential Transformers (LVDTs) 110 coupled to the top end of respective push rods 120. As used herein, the use of the term "top end" indicates a location at or near a longitudinal end illustrated at a top of the elongation measurement apparatus 100 as oriented in FIG. 1, and the use of the term "bottom end" indicates a location at or near an opposing longitudinal end illustrated at a bottom of the elongation measurement apparatus 100 as oriented in FIG. 1, such orientation being only exemplary and not limiting to the present invention.

At least one of the two or more LVDTs 110 and push rods 120 may comprise at least a part of a sample carrier assembly, and at least one other of the two or more LVDTs 110 and push rods 120 may comprise at least a part of a control component assembly. The sample carrier assembly is referred to herein as a sample carrier 140. In at least some embodiments, the sample carrier 140 may include an optional housing 145 with the LVDT 110 at a top end of the housing 145 and the housing 145 encompassing the push rod 120 coupled to the LVDT 110. A bottom end of the push rod 120 of the sample carrier 140 is spaced apart from a bottom end of the housing 145. A space between the bottom end of the push rod 120 and the bottom end of the housing 145 is configured to receive a portion of material, referred to herein as a sample 130, such that the sample 130 is positioned adjacent to the bottom end of the push rod 120 and the bottom end of the housing 145. As shown in the embodiment illustrated in FIG. 1, the elongation measurement apparatus 100 may comprise a plurality of sample carriers 140. In such embodiments, the sample 130 may comprise the same material for each of the plurality of sample carriers 140, or the sample 130 may comprise different materials in at least some of the plurality of sample carriers 140.

The control component assembly, referred to herein as a control component 150, according to at least some embodiments, may include an optional housing 155 with the LVDT 110 at the top end and the housing 155 at least substantially encompassing the push rod 120 coupled to the LVDT 110. The push rod 120 of the control component 150 extends from the LVDT 110 at the top end to the bottom end of the housing 155, the bottom end of the push rod 120 abutting the bottom end of the housing 155. In other words, the push rod 120 of the control component 150 is configured and positioned with the top end abutting the LVDT 110 and the bottom end abutting the bottom end of the housing 155.

The push rod 120 of each of the sample carrier 140 and the control component 150 may be of sufficient length that the top end that includes the LVDT 110, is spaced far enough away from a test environment's source so as to avoid damage to the LVDT 110 and its components. By way of example and not limitation, in at least some embodiments, the push rod 120 may comprise a length in the range of about 0.5 meter to 2 meters. In some embodiments, the push rod 120 may comprise a length of about 1 meter. However, the length of the push rod is not intended to be limiting to the invention. Each push rod 120, as well as each optional housing 145, 155, may comprise a material having well-characterized or well-known thermal expansion properties. By way of example and not limitation, the push rods 120 and the housings 145, 155 may comprise a metal material, such as stainless steel. The sample carrier 140 and the control component 150 are, therefore, at least substantially similar to each other, except that the sample carrier 140 is configured to receive a sample 130, while the control component 150 is not so configured.

In at least some embodiments, the sample carrier 140 and the control component 150 may each include one or more respective thermocouples 185 configured to monitor the temperature of the sample 130, the push rod 120, the housings 145, 155, or other components of the elongation measurement apparatus 100 and combinations thereof. The thermocouple 185 may comprise any conventional thermocouple as is known in the art and may be selected according to the specific application.

At least one sample carrier 140 and the at least one control component 150 may be positioned within an elongated enclosure 190. The elongated enclosure 190 may comprise a metal or metal alloy, such as steel. In at least some embodiments, the elongated enclosure 190 may contain an inert gas, such as, by way of example and not limitation, helium or neon.

Each LVDT 110 may comprise any conventional LVDT, which typically comprises a primary coil 160 and two secondary coils 170 on either side of the primary coil 160. A ferromagnetic core 180 extends through the primary and secondary coils 160, 170 and is coupled to a push rod 120. When a current is driven through the primary coil 160, a voltage is induced in each secondary coil 170 proportional to its mutual inductance with the primary coil 160. As the core 180 moves, these mutual inductances change, causing the voltages induced in the secondary coils 170 to change. The secondary coils 170 are typically connected in reverse series, so that the output voltage is the difference between the two secondary voltages.

When the core 180 is in its central position, equidistant between the two secondary coils 170, equal but opposite voltages are induced in the two secondary coils 170, resulting in a voltage output of zero. When the core 180 is displaced in one direction, the voltage in one secondary coil 170 increases as the voltage in the other secondary coil 170 decreases, causing the output voltage to increase from zero to a maximum. This voltage is in phase with the primary voltage. When the core 180 moves in the other direction, the output voltage also increases from zero to a maximum, but its phase is opposite to that of the primary voltage. The magnitude of the output voltage is linearly proportional to the distance moved by the core 180 (up to its limit of travel). The phase of the voltage indicates the direction of the displacement.

The LVDTs 110 may be selected according to the specific application. For example, in high-temperature applications, an off-the-shelf LVDT 110 may be selected which is configured for use in high-temperature environments. By way of example and not limitation, a suitable high-temperature LVDT for a nuclear facility may include the XS-ZTR series by Measurement Specialties, Inc. of Hampton, Va. The XS-ZTR series LVDT comprises a hermetically sealed sensor constructed entirely of inorganic materials, principally metals and ceramics, and is rated for use in high temperatures (up to about 550° C.) and exposure to radiation levels of $10^{11}$ rads ($10^9$ Gy).

Figure 2:
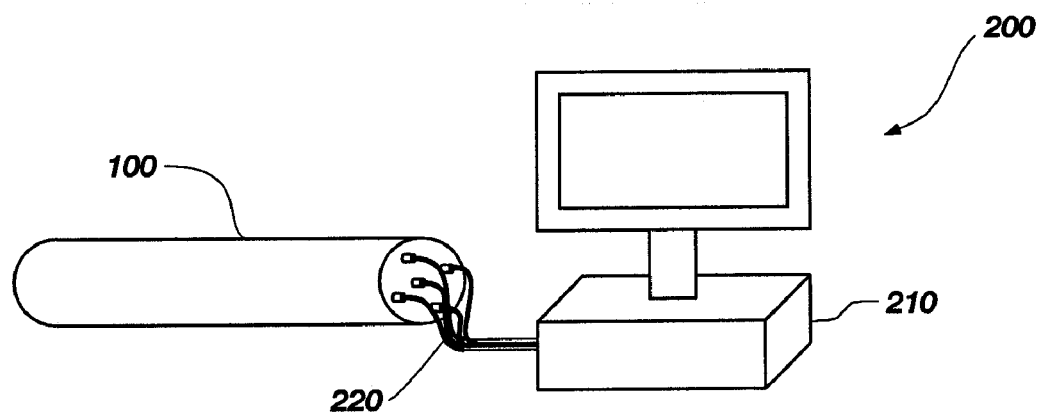
FIG. 2 illustrates an elongation measurement system according to at least one embodiment.

Additional embodiments of the present invention include elongation measurement systems. FIG. 2 illustrates an elongation measurement system 200 according to at least one embodiment. The elongation measurement system 200 may comprise an elongation measurement apparatus 100, such as any of the embodiments described above with reference to FIG. 1, and a computational system 210. The computational system 210 may comprise any conventional or special purpose computer or microcomputer system generally comprising an input device, an output device, a processor and a memory device. The computational system 210 is coupled with the elongation measurement apparatus 100 and configured to receive data from the two or more LVDTs 110, including the at least one sample carrier 140 and the at least one control component 150. In some embodiments, the LVDTs 110 may be coupled directly to the computational system 210. In other embodiments, the LVDTs 110 may be coupled to interfacing circuitry (not shown), such as a signal conditioner circuitry, etc., configured to generate data in response to the voltages received from the LVDTs 110, such interfacing circuitry being communicatively coupled to the computational system 210. In at least some embodiments, the elongation measurement apparatus 100 includes wiring 220 coupled at least to the LVDTs 110 and extending from the top end, at least a portion of the wiring 220 adjacent the top end comprising a hard sheathing for protecting the wiring from harsh environments, as is known in the art. The computational system 210 comprises programming configured to calculate a real-time elongation measurement from the data received from the two or more LVDTs 110.

Such a system may be employed to measure the elongation of a material in a specific test environment, such as an environment which is heated, irradiated, or both. In operation, according to at least one embodiment, a sample 130 may be positioned within the at least one sample carrier 140. The sample 130 may comprise any material for which it is desired to obtain accurate elongation characteristics when exposed to cooling, heating, irradiation, or any combination thereof. The elongation measurement apparatus 100 may be positioned at least partially into the test environment, such that the longitudinal end, described as the bottom end in FIG. 1, is proximate or adjacent to the cooling, heating or irradiation source or within some predetermined relation to the source. The change in temperature or exposure to radiation, or both, of the sample 130, as well as the push rod 120 and other components of the elongation measurement apparatus 100, may cause the components to elongate. Elongation of the sample 130 of each sample carrier 140 causes the core 180 of the LVDT 110 of the sample carrier 140 to shift, generating a voltage signal representing an amount of elongation. Similarly, elongation of the push rod 120 and other components in the control component 150 causes the core 180 of the LVDT 110 of the control component 150 to shift, generating a voltage signal representing an amount of elongation.

The amount of elongation for the sample carrier 140 and for the control component 150 is communicated to the computational system 210. The configuration of the control component 150 provides an error correction measurement allowing the computational system 210 to determine the actual elongation of the sample 130. In other words, the control component 150 comprises all of the same components as the sample carrier 140, except the sample 130. Thus, any elongation in the push rod 120 or other components will be measured in the control component 150 and can be subtracted out of the measured elongation of the sample carrier 140. The computational system 210 is configured to receive the elongation measurements from the sample carrier 140 and the control component 150 and to perform the subtraction operation between the two measurements to generate an elongation measurement for the sample 130.

Figure 3:
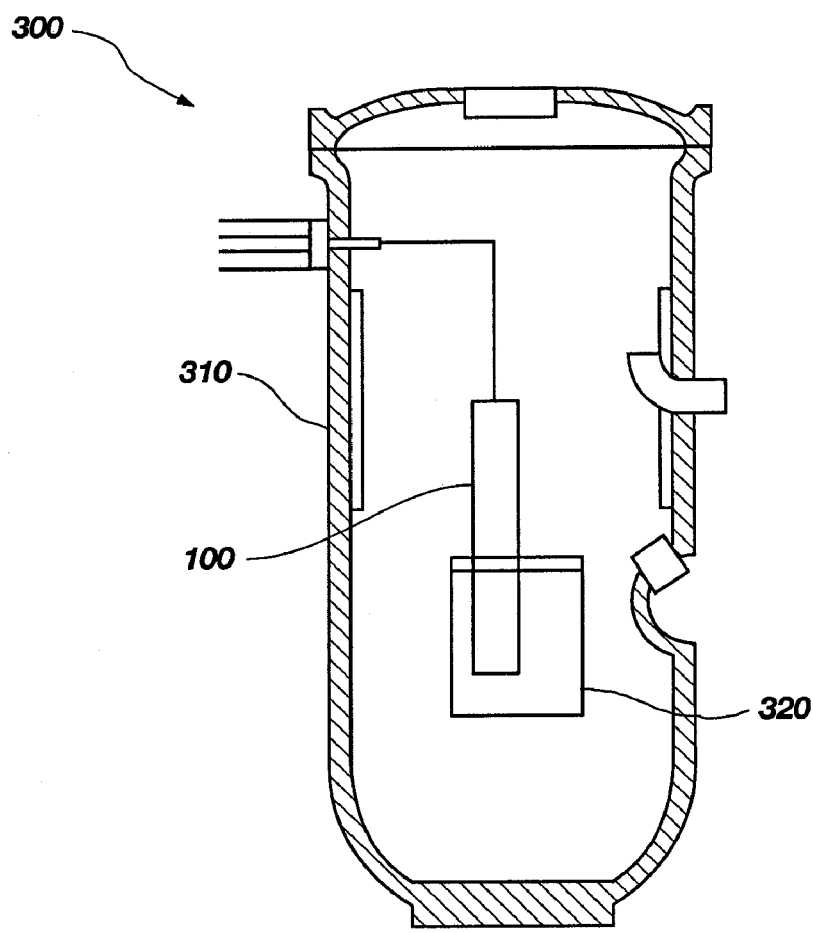
FIG. 3 illustrates a nuclear reactor comprising an elongation measurement apparatus according to at least one embodiment.

Additional embodiments of the present invention include nuclear reactors comprising at least one elongation measurement apparatus. FIG. 3 illustrates a nuclear reactor 300 according to at least one embodiment. The nuclear reactor 300 may comprise a test reactor, a power generating nuclear reactor, or any other system including a reactor core. In some embodiments, the nuclear reactor 300 may comprise a reactor vessel 310 having a reactor core 320 therein. In embodiments in which the nuclear reactor 300 comprises a power generating nuclear reactor, the reactor vessel 310 may comprise a pressure vessel including one or more inlets for coolant to flow into the reactor vessel 310 and one or more outlets for the coolant to exit from the reactor vessel 310. Although the embodiment shown in FIG. 3 includes a reactor vessel 310, those of ordinary skill in the art will recognize that other configurations are possible in which no reactor vessel 310 is included. For example, in some embodiments the nuclear reactor 300 may comprise a pool-type test reactor without a reactor vessel.

The reactor core 320 comprises at least one fuel assembly and at least one control rod inserted therein (not shown). At least one elongation measurement apparatus 100 may be positioned with at least the bottom end, the end comprising the sample 130 (see FIG. 1), located at a predetermined position relative to the reactor core 320. The position of the at least one elongation measurement apparatus 100 may be dependent upon the sample material and the parameters under which the sample material is to be tested. For example, a sample may be intended to be tested with a specific radiation exposure and may, therefore, be positioned with the bottom end of the at least one elongation measurement apparatus 100 in a selected flux trap or test position near the center of the reactor core 320 where higher fluxes occur. The top end of the at least one elongation measurement apparatus 100 may extend away from the heat or radiation source.

Figure 4:
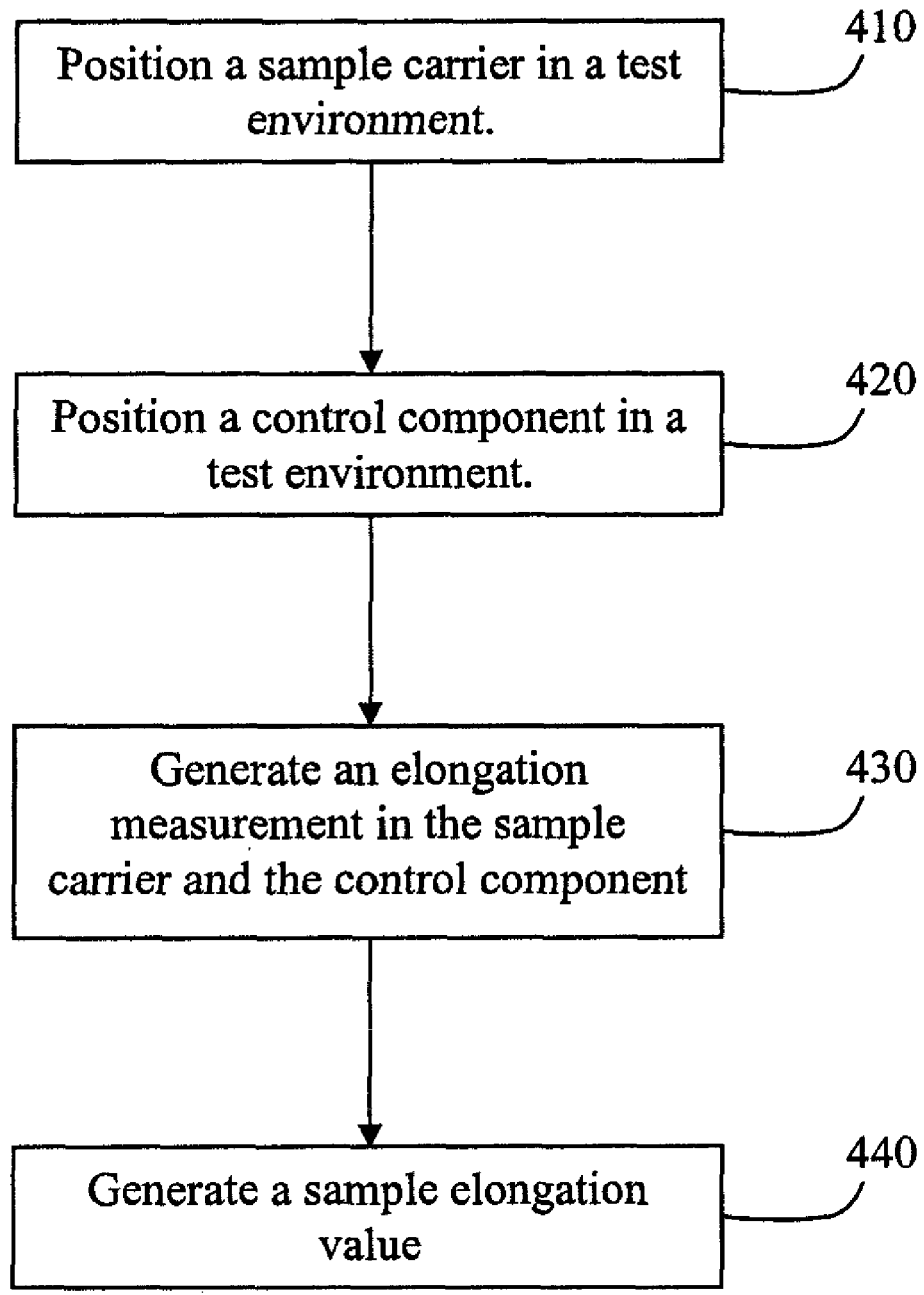
FIG. 4 is a flowchart illustrating a method for measuring elongation of a material, according to at least one embodiment.

Further embodiments of the present invention include methods for measuring elongation of a material. FIG. 4 is a flowchart illustrating a method for measuring elongation of a material, according to at least one embodiment. In at least some embodiments, such a method may include positioning a sample carrier in a test environment 410. By way of example and not limitation, the test environment may comprise an environment which is heated, cooled or irradiated, as well as any combinations thereof. In some embodiments, at least a portion of the sample carrier may be placed in a portion of a nuclear reactor, such as a test reactor or a power generating reactor. The sample carrier may include an LVDT at one longitudinal end thereof and a sample of a material at an opposing longitudinal end thereof, as described hereinabove. The sample carrier is positioned with the one longitudinal end with the LVDT located longitudinally away from the source of the test environment's state, and the opposing longitudinal end comprising a sample of material located at a point nearest or adjacent to the source. In other words, the sample carrier is positioned with the opposing longitudinal end nearest to the test environment's source and extends longitudinally away from the test environment's source such that the one longitudinal end is located away from the source to a length approximately equivalent to the length of the push rod.

A control component is also positioned in the test environment 420. The control component is positioned in similar orientation as the sample carrier, with an LVDT at one longitudinal end located away from the test environment's source, and with an opposing longitudinal end at the point nearest or adjacent to the source. The control component is configured at least substantially similar to the sample carrier except that the control component does not have a sample of material.

An elongation measurement is generated by both the sample carrier and the control component as the temperature of the assemblies increases or decreases 430. The elongation measurement may be generated by the respective LVDT of the sample carrier and the control component as the respective push rod causes the LVDT core to move longitudinally in the LVDT.

The elongation measurement from the control component is subtracted from the elongation measurement from the sample carrier, resulting in a sample elongation value 440. Such computations may be carried out in a computational system, such as a conventional computer, and the resulting sample elongation value may be provided to a user, for example, by displaying the resulting sample elongation value on a screen or printing the value.

Although the foregoing description includes examples describing "elongation" of a sample or other components, such a term is not intended to be limiting. Indeed, the present invention has application in measuring both elongation and contraction of materials and components.

While certain embodiments have been described and shown in the accompanying drawings, such embodiments are merely illustrative and not restrictive of the scope of the invention, and this invention is not limited to the specific constructions and arrangements shown and described, since various other additions and modifications to, and deletions from, the described embodiments will be apparent to one of ordinary skill in the art. Thus, the scope of the invention is only limited by the literal language, and legal equivalents, of the claims which follow.

What is claimed is:

1. An elongation measurement apparatus, comprising:
an enclosure;
at least one sample carrier within the enclosure comprising:
a Linear Variable Differential Transformer (LVDT) at one longitudinal end of the at least one sample carrier; and
a push rod coupled to the LVDT and extending to a location proximate an opposing longitudinal end of the at least one sample carrier;
wherein the at least one sample carrier is configured to receive a sample between and adjacent to the push rod and the opposing longitudinal end of the at least one sample carrier; and
at least one control component within the enclosure comprising:
a control LVDT at one longitudinal end of the at least one control component; and
a control push rod coupled to the control LVDT and extending to and adjoining an opposing longitudinal end of the at least one control component.

2. The apparatus of claim 1, wherein the enclosure comprises an inert gas contained therein.

3. The apparatus of claim 1, further comprising a thermocouple within each of the at least one sample carrier and the at least one control component.

4. The apparatus of claim 1, wherein the push rod of the at least one sample carrier and the control push rod of the at least one control component comprise the same material.

5. The apparatus of claim 1, comprising a plurality of sample carriers within the enclosure.

6. An elongation measurement system, comprising:
at least two Linear Variable Differential Transformers (LVDTs);
a push rod coupled to each of the at least two LVDTs at one longitudinal end thereof;
wherein at least one push rod extends to a base and is coupled thereto, and at least one other push rod extends to a location spaced apart from the base and is configured to receive a sample between the at least one other push rod and the base; and
a computational system electrically coupled to the at least two LVDTs.

7. The system of claim 6, further comprising an elongated housing, wherein the at least two LVDTs are positioned within the elongated housing.

8. The system of claim 7, wherein the elongated housing comprises an inert gas contained therein.

9. The system of claim 6, further comprising a thermocouple coupled to the at least one push rod, the at least one other push rod, or the sample.

10. The system of claim 6, wherein the computational system comprises an input device, an output device, a processor and a memory device.

11. A nuclear reactor, comprising:
a reactor core;
at least one elongation measurement apparatus positioned with one longitudinal end away from the reactor core and with an opposing longitudinal end directed toward the reactor core;
the at least one elongation measurement apparatus comprising at least two Linear Variable Differential Transformers (LVDTs) at the one longitudinal end thereof and a push rod coupled to each of the at least two LVDTs;
wherein at least one push rod extends to the opposing longitudinal end and is coupled thereto; and
at least one other push rod extends to a location spaced apart from the opposing longitudinal end and is configured to receive a sample between the at least one other push rod and the opposing longitudinal end.

12. The nuclear reactor of claim 11, further comprising a reactor vessel housing the reactor core.

13. The nuclear reactor of claim 12, wherein the reactor vessel comprises a pressure vessel.

14. The nuclear reactor of claim 11, wherein the at least one elongation measurement apparatus is positioned at least partially within the reactor core.

15. The nuclear reactor of claim 11, further comprising a thermocouple coupled to each push rod or a sample positioned between the at least one other push rod and the opposing longitudinal end.

16. A method of measuring elongation of a material, comprising:
positioning at least one sample carrier in a test environment with a longitudinal end comprising a Linear Variable Differential Transformer (LVDT) positioned away from a source of the test environment and an opposing longitudinal end comprising a sample positioned toward the source of the test environment, the at least one sample carrier comprising a push rod extending between the sample and the LVDT;
positioning at least one control component in the test environment with a longitudinal end comprising a control LVDT positioned away from the source of the test environment and an opposing longitudinal end positioned toward the source of the test environment, the at least one control component comprising a push rod extending between the opposing longitudinal end thereof and the control LVDT;

generating respective elongation measurements with the LVDT of the at least one sample carrier and with the LVDT of the at least one control component; and generating a sample elongation value comprising a difference between respective elongation measurements of a sample carrier and a control component.

17. The method of claim 16, wherein positioning the at least one sample carrier in the test environment and positioning the at least one control component in the test environment comprises positioning the at least one sample carrier and the at least one control component in at least one of a heated environment, a cooled environment, and an irradiated environment.

18. The method of claim 16, wherein positioning the at least one sample carrier in the test environment and positioning the at least one control component in the test environment comprises positioning the at least one sample carrier and the at least one control component at least partially within a nuclear reactor.

19. The method of claim 16, wherein positioning the at least one sample carrier in the test environment and positioning the at least one control component in the test environment comprises positioning an elongated enclosure in the test environment, the elongated enclosure comprising the at least one sample carrier and the at least one control component therein.

20. The method of claim 19, wherein positioning the elongated enclosure comprises positioning the elongated enclosure comprising an inert gas contained therein.

21. The method of claim 16, wherein positioning at least one sample carrier in the test environment comprises positioning a plurality of sample carriers in the test environment.

22. The method of claim 16, further comprising measuring a temperature of at least a portion of at least one of the at least one sample carrier and the at least one control component.

* * * * *

UNITED STATES PATENT AND TRADEMARK OFFICE
CERTIFICATE OF CORRECTION

PATENT NO. : 8,065,810 B2
APPLICATION NO. : 12/419916
DATED : November 29, 2011
INVENTOR(S) : Joy L. Rempe et al.

Page 1 of 1

It is certified that error appears in the above-identified patent and that said Letters Patent is hereby corrected as shown below:

On the title page:
In ITEM (74) *Attorney, Agent, or Firm*:    change "Traskbritt" to --TraskBritt--

Signed and Sealed this
Seventeenth Day of September, 2013

Teresa Stanek Rea
*Deputy Director of the United States Patent and Trademark Office*